Figure 1:
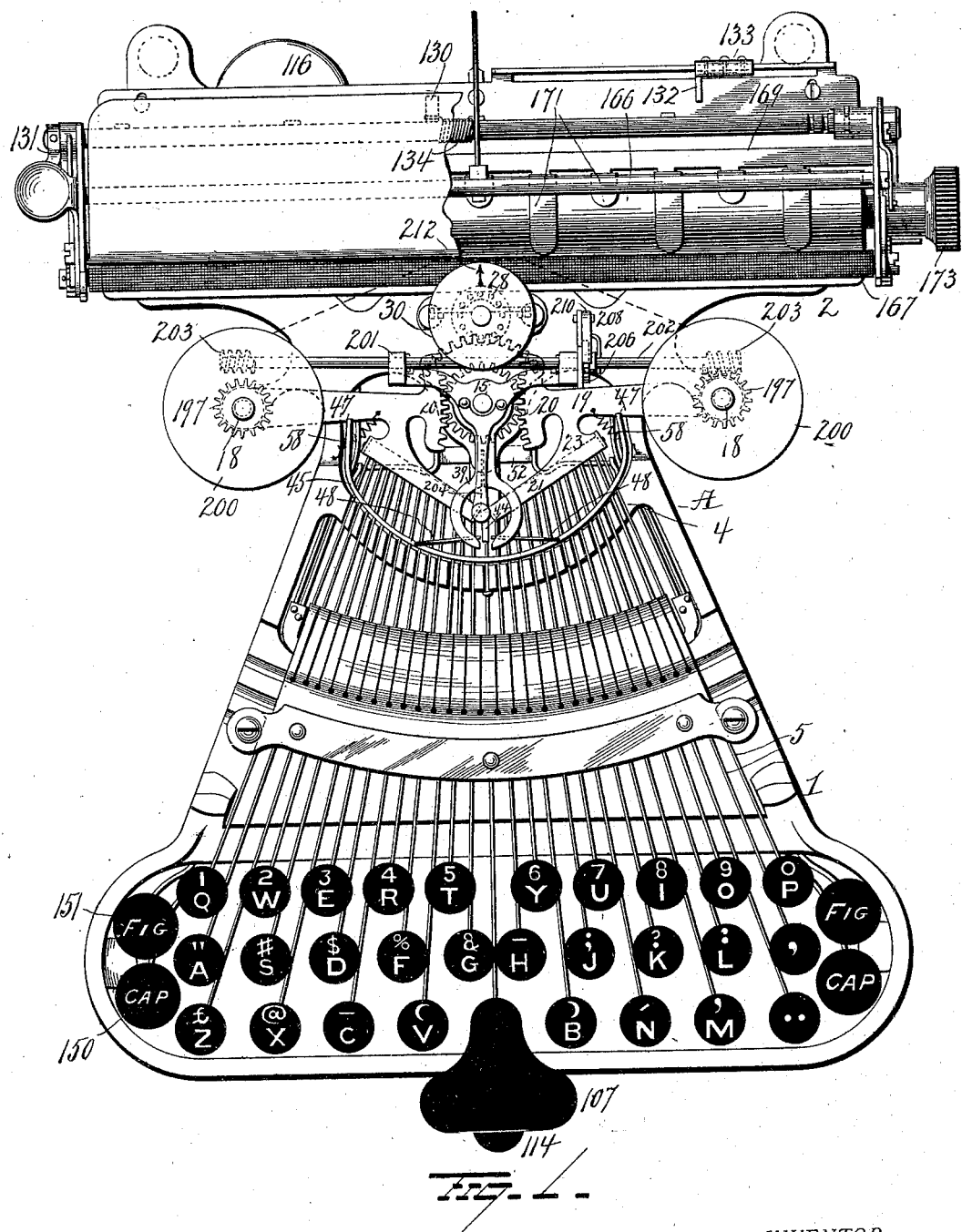

No. 625,729. Patented May 23, 1899.
R. W. UHLIG.
TYPE WRITING MACHINE.
(Application filed Sept. 18, 1897.)
(No Model.) 11 Sheets—Sheet 1.

WITNESSES
INVENTOR
R. W. Uhlig
by H. A. Seymour
Attorney

No. 625,729. Patented May 23, 1899.
R. W. UHLIG.
TYPE WRITING MACHINE.
(Application filed Sept. 18, 1897.)
(No Model.) 11 Sheets—Sheet 2.

WITNESSES
INVENTOR
R. W. Uhlig
By H. A. Seymour
Attorney

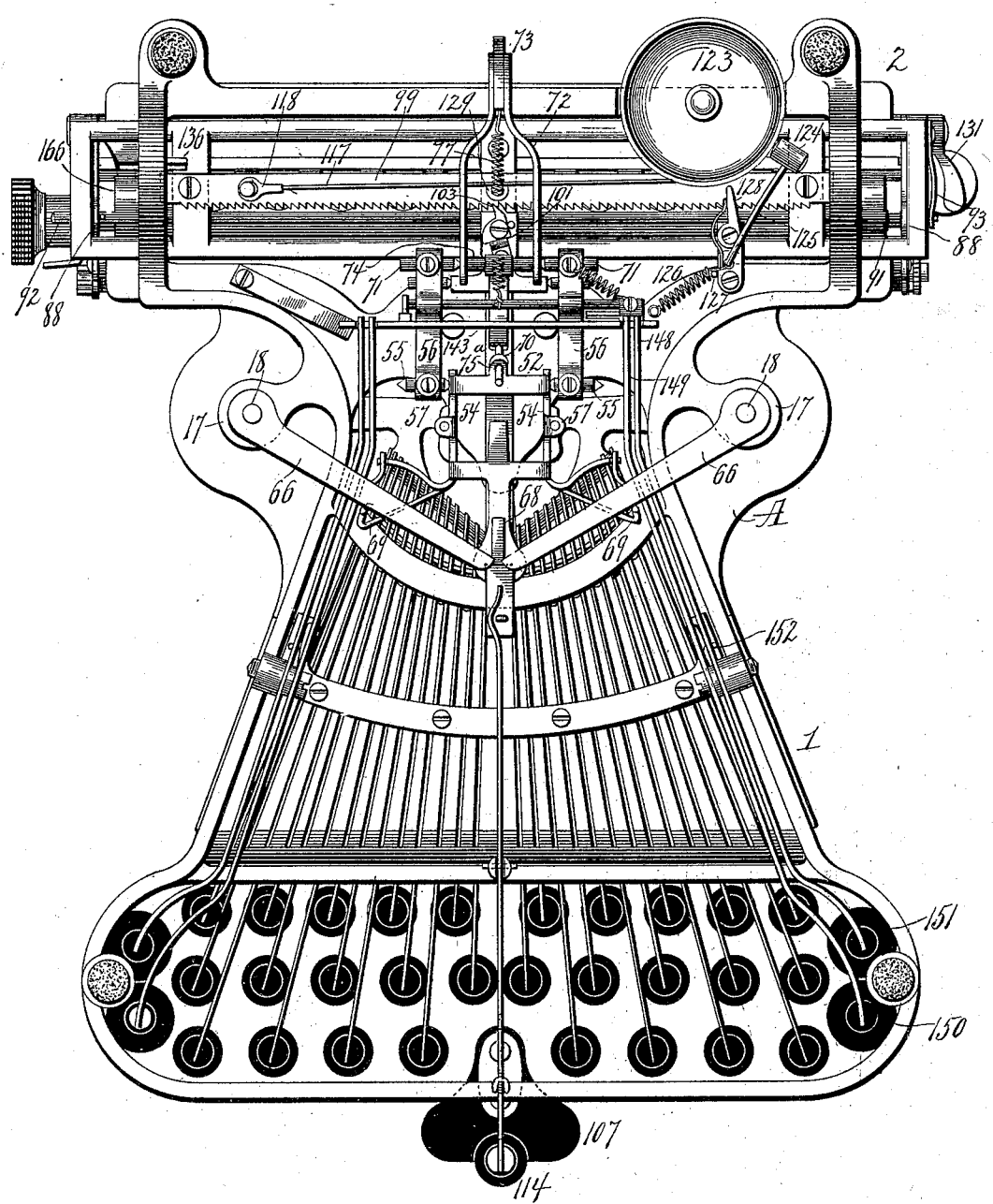

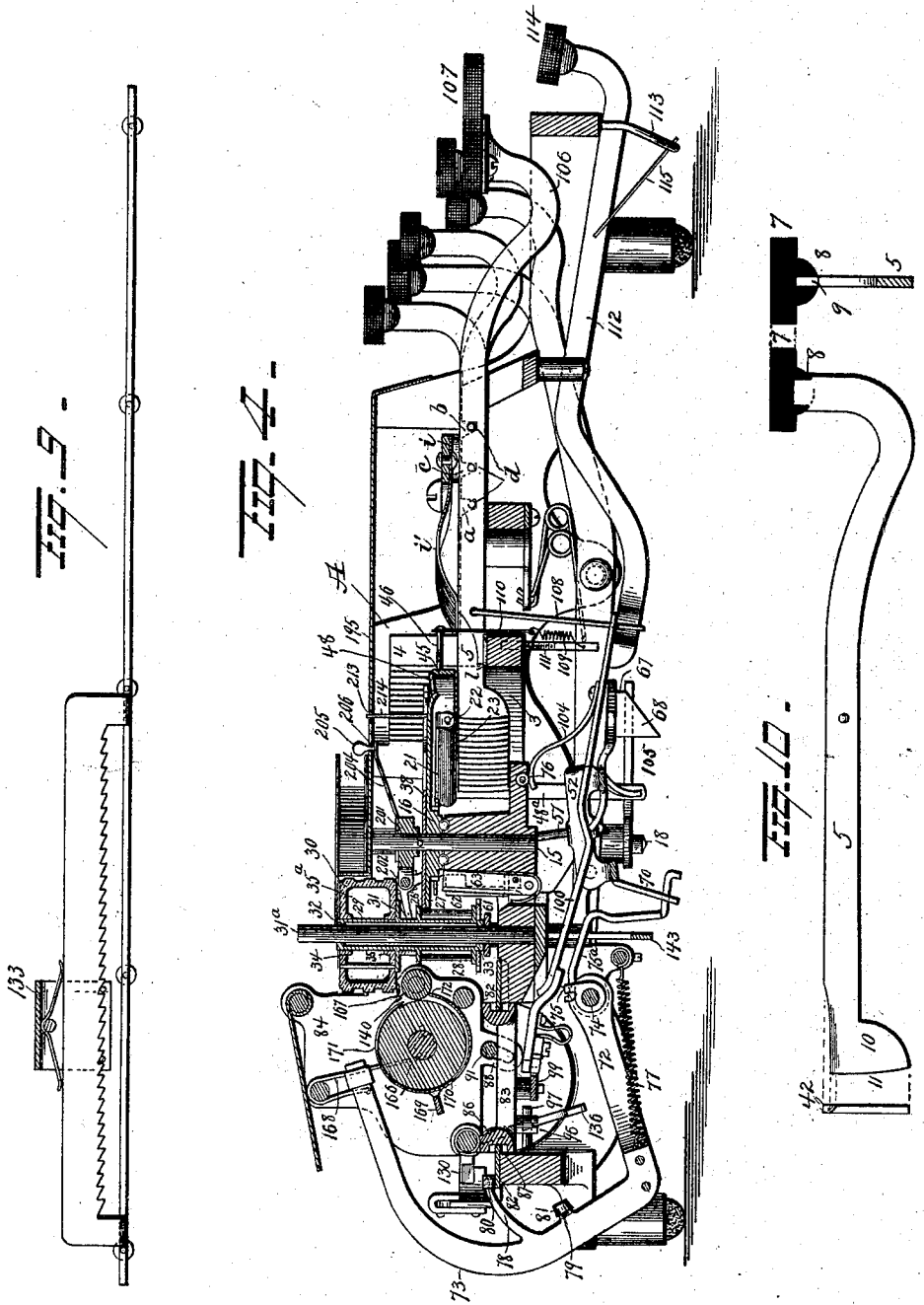

No. 625,729. Patented May 23, 1899.
R. W. UHLIG.
TYPE WRITING MACHINE.
(Application filed Sept. 18, 1897.)
(No Model.) 11 Sheets—Sheet 5.
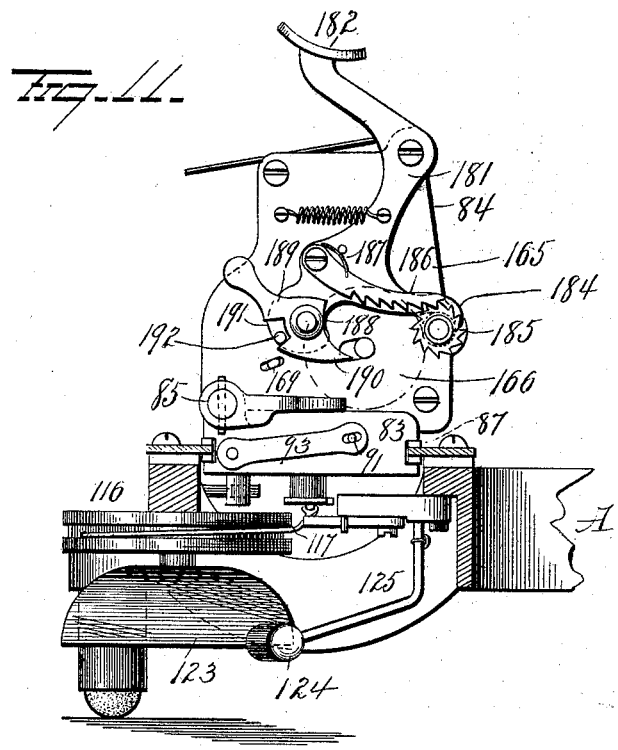
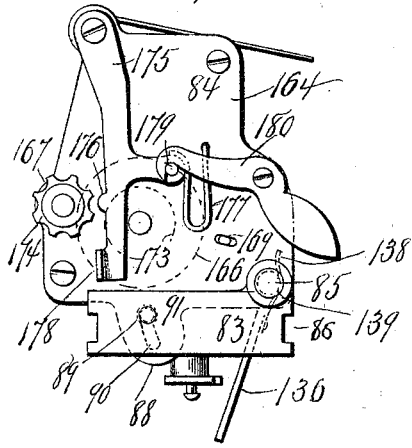
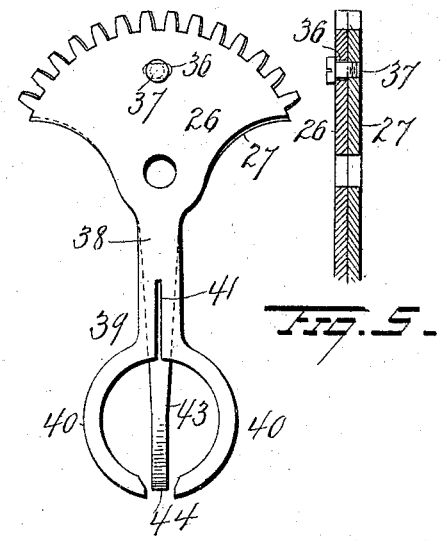
WITNESSES
E. J. Nottingham
G. F. Downing
INVENTOR
R. W. Uhlig
By H. A. Seymour
Attorney

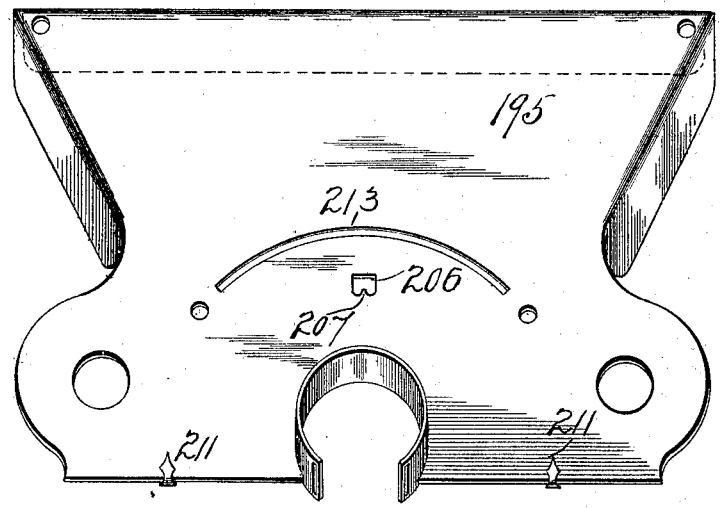
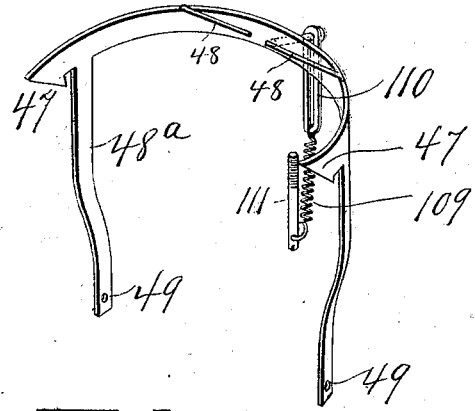

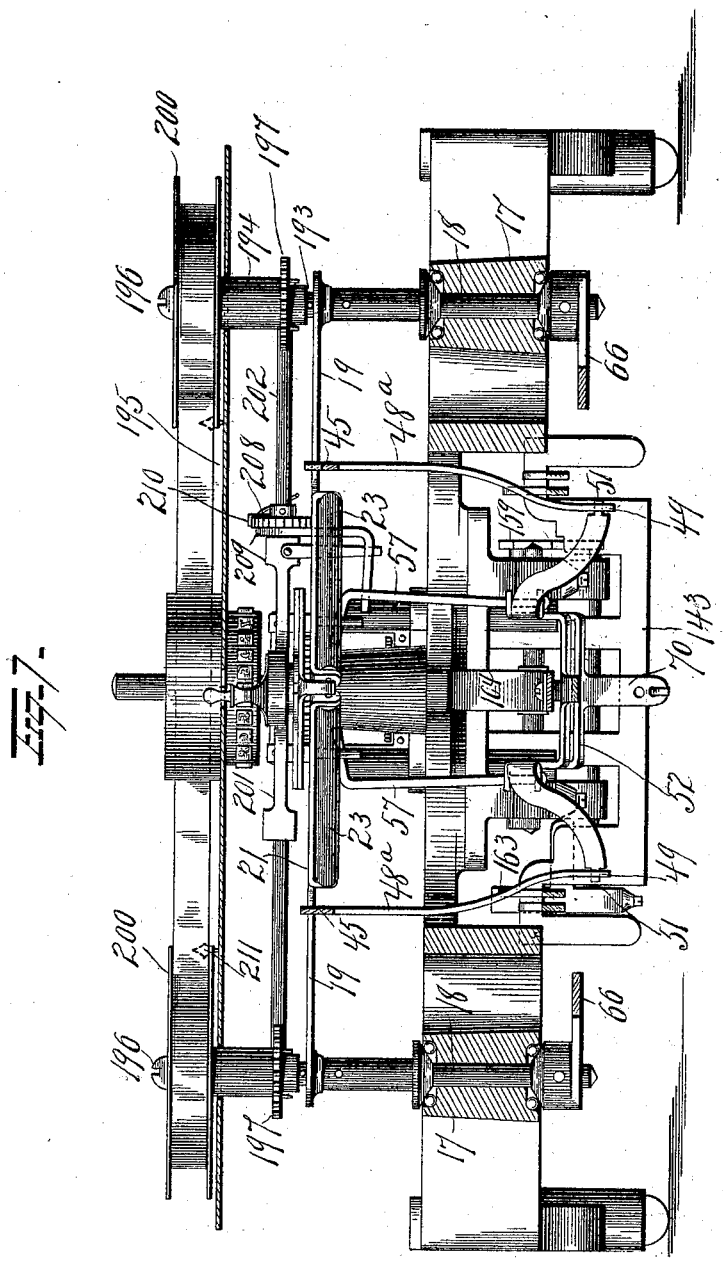

No. 625,729. Patented May 23, 1899.
R. W. UHLIG.
TYPE WRITING MACHINE.
(Application filed Sept. 18, 1897.)
(No Model.)
11 Sheets—Sheet 8.
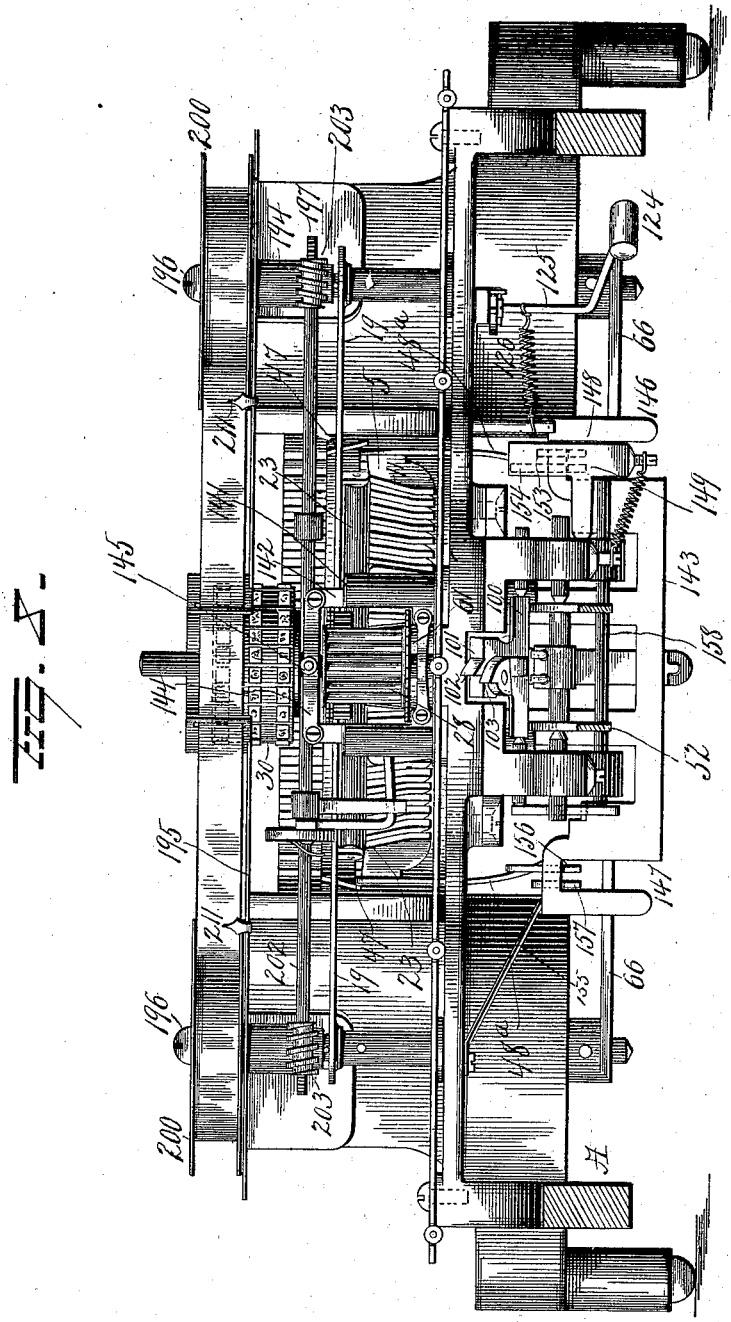

No. 625,729. Patented May 23, 1899.
R. W. UHLIG.
TYPE WRITING MACHINE.
(Application filed Sept. 18, 1897.)
(No Model.) 11 Sheets—Sheet 9.
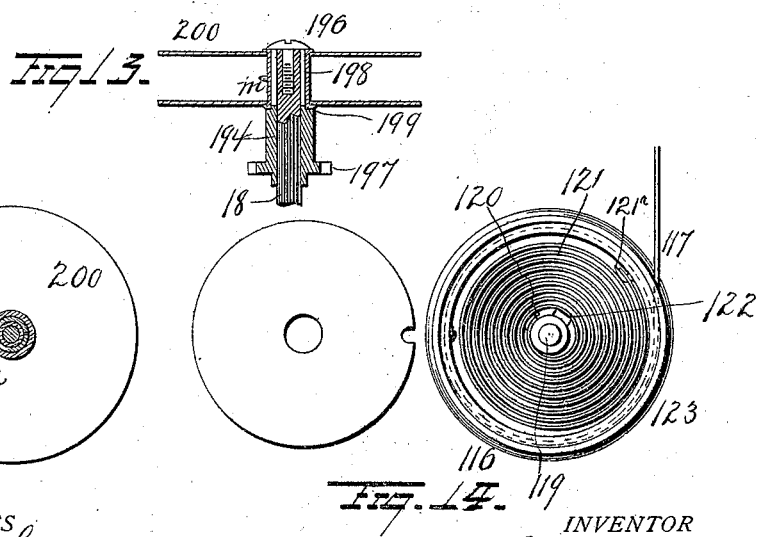
WITNESSES
E. J. Nottingham
G. F. Downing
INVENTOR
R. W. Uhlig
By H. A. Seymour
Attorney No. 625,729. Patented May 23, 1899.
R. W. UHLIG.
TYPE WRITING MACHINE.
(Application filed Sept. 18, 1897.)
(No Model.) 11 Sheets—Sheet 10.
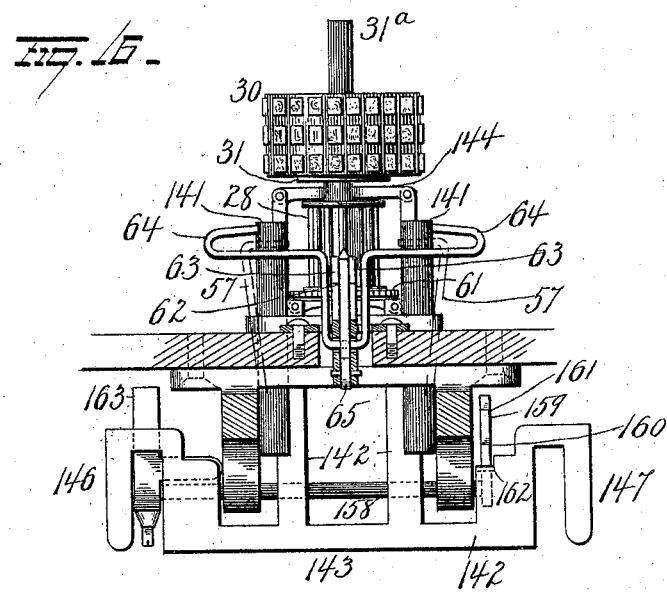
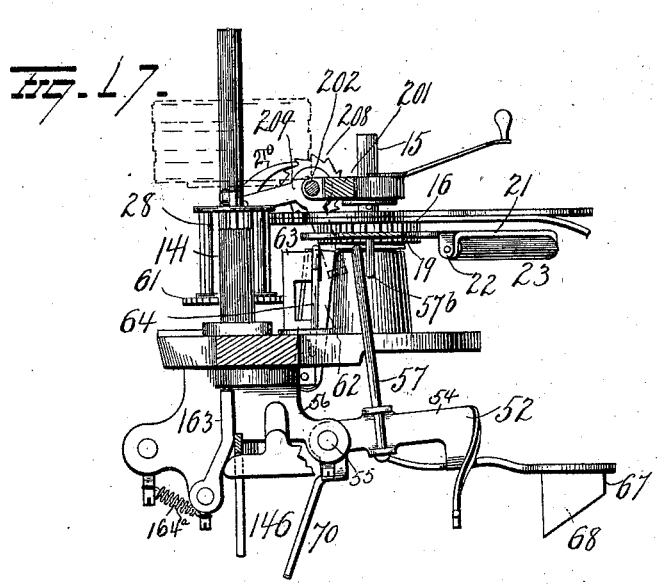
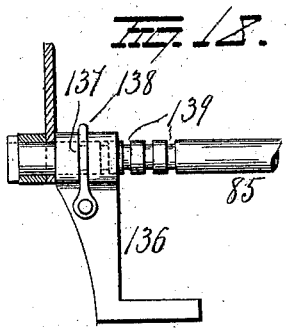
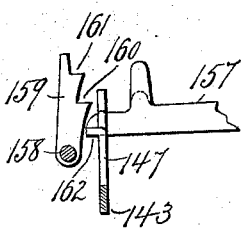
WITNESSES
E. J. Nottingham
G. F. Downing
INVENTOR
R. W. Uhlig
By H. A. Seymour
Attorney No. 625,729. Patented May 23, 1899.
R. W. UHLIG.
TYPE WRITING MACHINE.
(Application filed Sept. 18, 1897.)
(No Model.) 11 Sheets—Sheet 11.
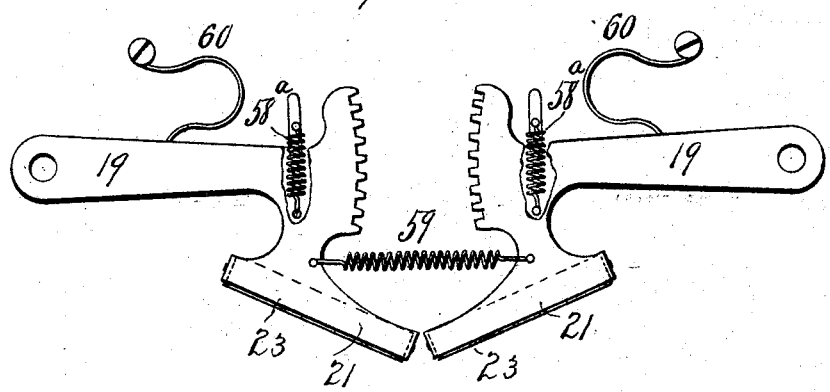
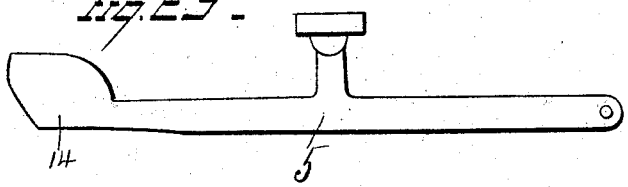
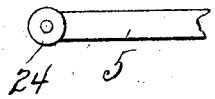
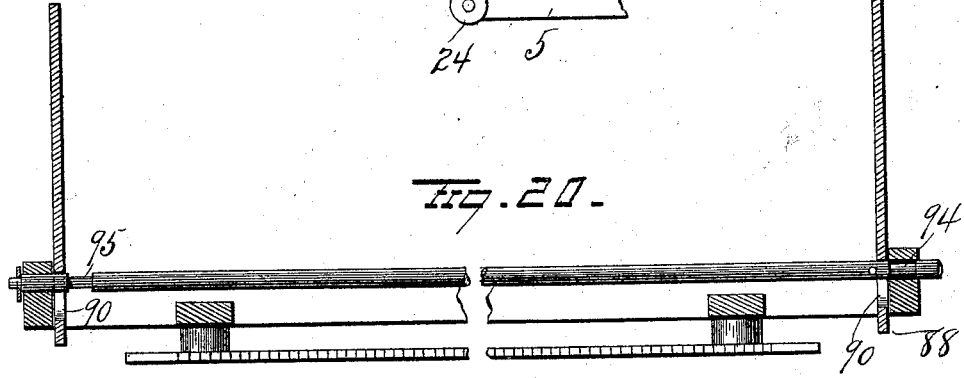
WITNESSES
E. S. Nottingham
G. F. Downing
INVENTOR
R. W. Uhlig
By H. A. Seymour
Attorney

UNITED STATES PATENT OFFICE.

RICHARD WILLIAM UHLIG, OF NEW YORK, N. Y., ASSIGNOR TO WILLIAM B. BALDWIN, OF SAME PLACE.

TYPE-WRITING MACHINE.

SPECIFICATION forming part of Letters Patent No. 625,729, dated May 23, 1899.

Application filed September 18, 1897. Serial No. 652,170. (No model.)

*To all whom it may concern:*

Be it known that I, RICHARD WILLIAM UHLIG, of New York, (College Point,) in the county of Queens and State of New York, have invented certain new and useful Improvements in Type-Writing Machines; and I do hereby declare the following to be a full, clear, and exact description of the invention, such as will enable others skilled in the art to which it appertains to make and use the same.

My invention relates to an improvement in type-writing machines, and more particularly to such as employ a revoluble type-carrier.

The objects of my present invention are to improve and simplify the construction and arrangement of various parts of the machine, to enhance its accuracy of operation and its efficiency, and to reduce the cost of production to a minimum without detracting from its capability to accurately and effectually perform all the functions of a modern type-writing machine.

A further object is to provide efficient means whereby to lock the type-carrier in writing position.

A further object is to so construct and arrange the flier of the machine that its coöperation with the key-levers will effect a stop for the type-carrier and also lock the latter against rotation in either direction after it shall have been moved to writing position.

A further object is to provide efficient means for returning the type-carrier and coöperating parts to normal position when a key-lever shall have been released.

A further object is to provide simple and efficient means whereby to lock the type-wheel in normal position.

A further object is to so arrange the radiating key-levers and finger buttons or keys that the letters or characters on the latter shall be disposed parallel with each other and at right angles to the operator without the necessity of bending or twisting the key-levers.

A further object is to improve and simplify the hammer mechanism of a type-wheel machine.

A further object is to provide simple means whereby to adjust the stroke of the hammer.

A further object is to provide a simple and efficient hammer-stop.

A further object is to provide simple means for compensating for wear in the gearing.

A further object is to provide the machine with simple indicating devices.

With these objects in view the invention consists in certain novel features of construction and combinations and arrangements of parts, as hereinafter set forth, and pointed out in the claims.

Figure 2:
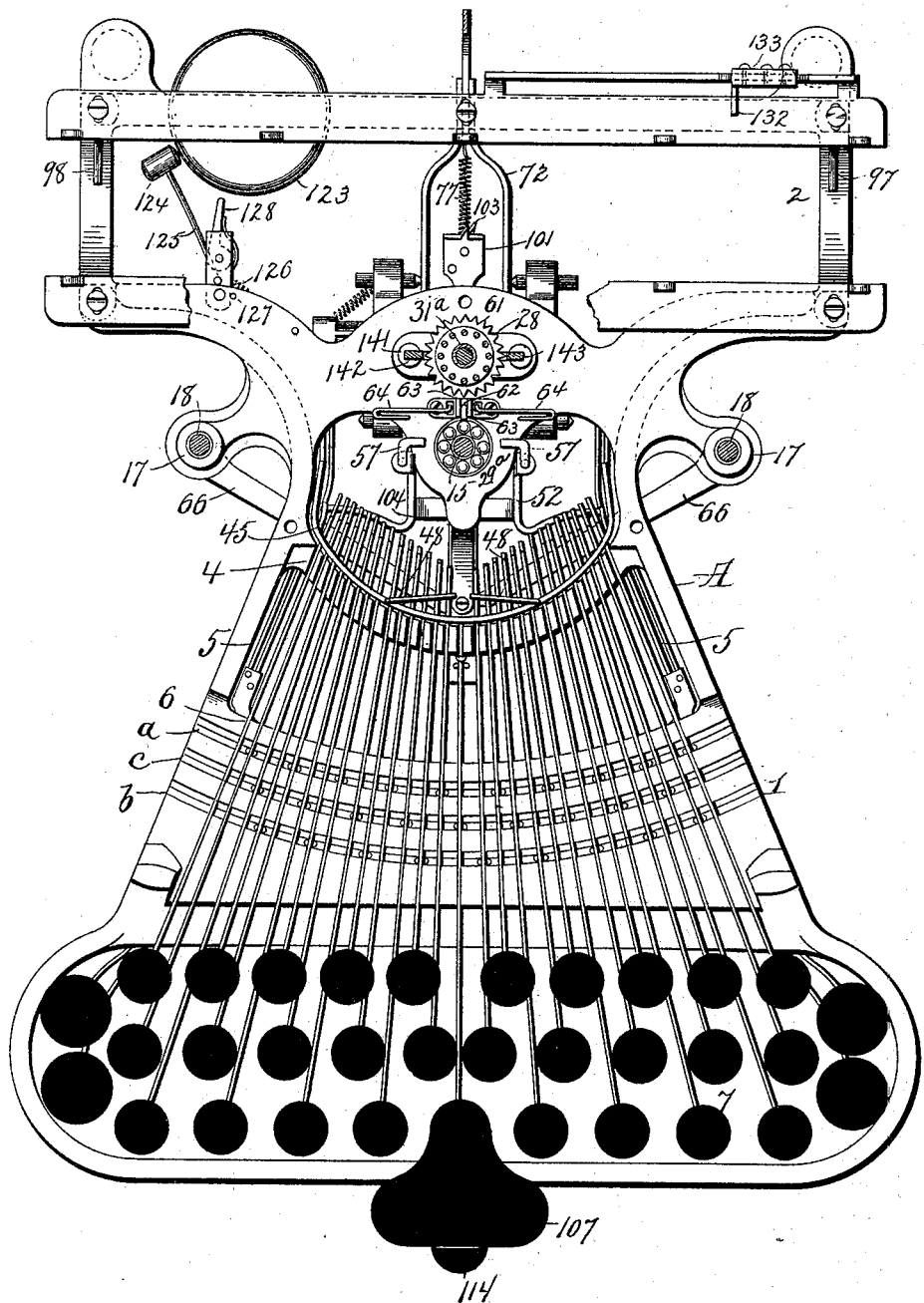

In the accompanying drawings, Figure 1 is a plan view of the machine with the cover removed and showing the ribbon-feed mechanism in position. Fig. 2 is a partial plan view with the cover and ribbon-feed mechanism removed. Fig. 3 is a bottom plan view. Fig. 4 is a longitudinal sectional view. Fig. 5 is an enlarged detail view showing the fliers. Fig. 6 is an enlarged detail view of the universal bar. Figs. 7 and 8 are cross-sectional views. Figs. 9 to 21 are views of various other details, and Figs. 22 to 24 illustrate modifications.

A represents the frame of the machine, comprising a tapering body portion 1 and a rear elongated portion 2, disposed at right angles to the body portion 1, for the reception of the carriage, which is mounted thereon in a manner hereinafter described in detail.

The inner or forward smaller end of the body portion 1 of the frame is made with a transverse web or bar 3, so curved as to make one-third of a circle concentric with the journal of the flier hereinafter described. The curved bar or web 3 projects above the upper face of the part 1 of the frame, so as to form a segmental flange 4, which is made with a number of notches for the reception and guidance of the key-levers 5. The key-levers 5 are also disposed in convergent slots or grooves 6, made in the upper face of part 1 of the frame in line with the notches of flange 4. The upper face of part 1 of the frame is also made with three segmental grooves $a\ b\ c$, at least one wall of each of which is made inclined, whereby to form contracted bottoms to said grooves, in which the pivot pins or trunnions $d$ of the key-levers have their bearing. The key-levers are so arranged that the bank of keys will be rectangular in form, and said bank may be said to be divided into three (more or less) sets or rows of keys with key-levers of varying lengths. The key-levers are provided with buttons or keys 7, and it is very desirable that the letters and characters on these buttons or keys be disposed at right angles to the writer; but it would be undesirable to bend or twist the key-levers for this purpose. In order, therefore, to dispose the buttons or keys so that the letters and characters of each row shall be parallel with each other or at right angles to the operator, each button or key is provided on its under face with an enlargement 8, and each enlargement is made with a socket 9 for the reception of the end of a key-lever, said sockets being disposed at a greater or less angle to the letter or character according to the key-lever on which the buttons or keys are placed, the relative angle of the letters or characters and sockets of the buttons or keys at the ends of the bank being greater than those of the intermediate buttons or keys and the angle of the sockets relatively to the letters or characters gradually decreasing toward the center of the bank or keyboard.

Each key-lever is provided at its forward end with a depending enlargement 10, having a slightly-inclined curved cam edge 11. The key-lever thus constructed is intended to coöperate with the type-wheel-moving mechanism presently to be described, and by the form of the cam end of the key-levers I am enabled to gain force at the first part of the stroke of a key-lever to lighten the touch. The key-levers are preferably fulcrumed between their ends, as above described; but they may be pivoted at their rear ends and the buttons or keys 13 secured thereto between the ends thereof, in which case the cam enlargement 14 will be reversed, as shown in Fig. 23.

A plate $i$ is secured to the frame of the machine over the key-levers and provided at one edge with a number of integral spring-fingers $i'$, which bear upon the key-levers, whereby to return the latter to their normal positions. The plate $i$ also serves to prevent the displacement of said key-levers. In order to cushion the key-levers, so as to prevent noise when they return to their normal position, a cord $l$ is laced through the notches of the segmental flange 4, so as to be seated in the bottoms of said notches and receive the key-levers when they fall.

A post 15 is disposed on the intermediate portion of the frame concentric with the segmental flange 4, and on this post a pinion 16 is loosely mounted. The intermediate portion of the frame is provided at each side of the center and in line with the post 15 with posts 17, in each of which a shaft 18 is mounted. Arms or levers 19 are secured to the respective shafts 18 and project inwardly toward each other, the free ends of said arms or levers being provided with rack-bars 20, disposed practically at right angles thereto and meshing with the pinion 16. Each arm or lever 19 is provided with a diagonal arm 21, and said arms project toward each other in proximity to the cam ends of the key-levers, terminating normally close to each other in line with the longitudinal axis of the machine. Each arm 21 is provided at its respective ends with lugs or ears 22, which constitute bearings for the journals of an antifriction-roller 23. The cam ends of the key-levers coöperate with the antifriction-rollers 23 to move the levers 19 and transmit motion to the pinion 16. Instead of providing the levers 19 with the rollers 23 the arms 21 of said levers may be made in the form of cams and the cams at the ends of the key-levers displaced by antifriction-balls 24, (or rollers,) as shown in Fig. 24.

Two segmental racks or toothed segments 26 27 are mounted loosely on the post 15, and the segment 27 is provided with the pinion 16, so as to rotate therewith. Both tooth-segments mesh with an elongated pinion 28, which is preferably in the form of a cage-wheel, so that they both move together, and are mounted on balls $29^a$, the latter having bearings in a groove or pocket in the frame. The elongated pinion 28 is made with a tubular extension or sleeve 29, on which the type wheel or carrier 30 is mounted and adapted to rest on an annular flange 31 on said sleeve, to which flange the type-carrier is secured by means of a pin, so as to cause it to rotate with the elongated pinion and its tubular extension. The pinion 28, with its tubular extension 29, is mounted to rotate on a post $31^a$, projecting upwardly from the framework, having bearing against said post only at the upper extremity of the sleeve 29, as at 32, and at the lower extremity of the pinion 28, as at 33, so as to reduce the friction to a minimum.

The type-wheel is made hollow and provided with internal flanges 34 35 at its top and bottom, so as to form a partial hub for the wheel. The type-wheel is also rounded internally, as at $35^a$, at the juncture of the top and bottom with the circumferential wall of the wheel, whereby to strengthen the same.

From the construction and arrangement of parts above described it will be seen that when a key-lever is depressed the levers 19 will be moved and transmit motion to the pinion 16. The segment 27 being secured to the pinion 16 motion will be imparted by it to the elongated type-wheel pinion 28 and set the type-wheel in accordance with the key-lever which has been depressed. The motion thus imparted to the elongated pinion 28 will be transmitted by the latter to the loose segment 26. The segments are located one upon the other, so that the teeth of the two segments will be coincident. There may of course be more or less wear between the teeth of the segments and the elongated pinion, and in order to compensate for or correct such wear the two segments are adjustably connected together. For this purpose one of the segments is made with an elongated slot 36, and a screw 37 is passed through this slot and made to enter a screw-threaded hole in the other segment, the head of the screw bearing against the face of the segment having the slot therein.

The upper segment 26 is made with an arm 38, which projects over the arms 21 of the wheel-moving levers 19, said arm 38 terminating in a flier 39, comprising two arms 40, curved in opposite directions and marking, approximately, a circle. The flier 39 is slit, as at 41, to permit the arms 40 to have a slight spring action and also to facilitate the lateral adjustment of said arms 40 by binding them relatively to each other. The free ends of the flier-arms 40 are beveled to insure the entrance of the key-levers, and the latter are made with upper beveled edges 42 to coöperate with the beveled ends of the arms 40. The under segment 27 is also provided with an arm which constitutes another flier 43, disposed under and parallel with the upper flier and terminating in a finger 44 immediately under and between the free ends of the arms 40 of the upper flier 39. With such construction when a key-lever is depressed the gearing will be moved, as above explained, and the two fliers will be moved laterally in the segment of a circle until the key-lever which has been operated is reached, when the beveled edge 42 of the key-lever will enter between the finger of the lower flier and one of the arms of the upper flier, and thus the further movement of the fliers and the gearing will be stopped and the type-wheel will be set with the desired letter or character in writing position. By making the arms of the upper flier adjustable laterally the space for the entrance of the key-levers between said arms and the lower flier can be accurately regulated.

It will be observed that the entrance of a key-lever between the fliers, as above explained, not only serves to stop the type-wheel at the proper letter, but that it also serves to lock the type-wheel against retrograde movement, and thus the type will be effectually locked against movement in either direction until the key-lever shall have been released by the operator. The type-wheel will therefore be held rigidly in writing position until the impression shall have been made and there will not be the slightest danger of inaccurate alinement in the writing on account of lost motion, the auxiliary flier 39 serving to take up all wear and lost motion.

A curved universal bar 45 is disposed over the forward ends of the key-levers within the segmental flange 4 and concentric with the latter. The universal bar 45 is provided centrally between its ends with a pin 46, which projects through one of the notches of the segmental flange 4 and serves to guide said bar in its vertical movements. The free ends of the universal bar are made to form inclined shoulders 47, adapted to engage the wheel-moving levers 19 and assist in returning the latter to their normal position and then holding them in their normal position. Thus when one of the levers 19 is moved forwardly by the depression of a key-lever at one side of the center of the keyboard the other lever 19, being in constant gear with the pinion 16, will be moved inwardly, and when the universal bar is permitted to fall to its normal position one of the inclined shoulders 47 will engage the lever 19 which had been moved inwardly and force it back to its normal position. Both levers 19 being geared with the same pinion 16 the forwardly-moved lever 19 will also be returned to its normal position and the type-wheel will be brought back to starting-point. The universal bar is also provided with two arms 48, which project toward each other and terminate a short distance apart at each side of the flier 43, so that when the universal bar and flier return to their normal positions the flier and parts connected therewith will be prevented from vibrating, the flier being stopped by engagement with one or the other of the arms 48 on the universal bar. From points at or near the ends of the universal bar bars or arms 48ª depend through the frame and are provided at their lower ends with holes 49, into which pins 51 at the end of a universal frame 52 project. The universal frame 52 is made with parallel bars 54, which are pivotally supported at their rear ends on adjustable arbors 55, mounted in brackets 56, secured to the frame of the machine. To the parallel bars 54, at points a short distance inwardly removed from their pivotal supports, arms 57 are secured and made to project upwardly, so as to terminate in proximity to the wheel-moving levers 19, said arms being bent at their upper ends, so as to engage depending pins 57ᵇ on the wheel-movers.

Springs 58 may be connected to the flier-segments and to the wheel-movers for assisting in returning the parts to their normal positions. The free ends of the arms 57 normally bear against the pins 57ᵇ on levers 19; but when a key-lever is operated and the universal bar raised the movement transmitted to the universal frame 52 and the parallel bars 54 will cause the free ends of said arms 57 to move away from the levers 19. When the key-lever shall have been released and the universal bar and coöperating parts permitted to return to their normal positions, the arms 57 will be moved toward the levers 19, and one of said arms engaging the pin on the lever 19 which had been moved rearwardly will assist in forcing said lever to its normal position, the other arm 57 meeting the other lever 19 when it arrives at normal position and preventing it from being moved too far, said arms 57 thus serving not only to return the parts, but also retain them in their normal positions.

If desired, springs 58ª may be attached at one end to the arms 57 and at their other ends to the frame of the machine for assisting in returning the parts to their normal positions; or, if desired, the arms 21 of the levers 19 may be connected by a spring 59, or a bent spring 60 may be used and made to bear against the respective levers 19. If desired, all the devices above described for returning the parts to normal position may be employed on the same machine, as shown in Fig. 23, and used in conjunction with the weighted parts connected with the universal bar.

In addition to the use of the auxiliary flier 39 for holding the type-wheel in writing position I prefer to also employ a positive lock. To this end a star-wheel 61 is secured to the lower end of the elongated pinion 28, and with this star-wheel a dog 62 is adapted to engage each time a key-lever is operated, and thus lock the type-wheel in the position to which it may be moved. The dog 62 is pivotally supported in the frame of the machine and guided in its movements by two guide arms or plates 63 63, secured to the machine-frame at the respective sides of said dog. Two bent arms 64 64 are secured to the dog 61 and project upwardly therefrom at the respective sides thereof and terminate within the path of movement of the arms 57, so that when the universal bar is raised by the operation of a key-lever and the pivoted universal frame 52 is turned on its fulcrum by the raising of the universal bar the upper ends of the arms 57 will be moved rearwardly and engaging the arms 64 will move the same, and thus cause the dog 62 to be turned on its fulcrum and engage the star-wheel 61, thereby positively locking the type wheel or carrier in writing position. When the key-lever which has been operated is released, so as to permit the return of the universal bar and universal frame, the arms 57 will be also returned to their normal positions and the dog 62 will be moved out of engagement with the star-wheel 61 by means of a spring 65, thus permitting the type-carrier to return to its normal position.

I have hereinbefore described how the type-carrier is returned to and retained in its normal position by the action of the shoulders at the ends of the universal bar and by means of the arms 57 on the universal frame; but to further insure the return to and retention of the type-carrier at normal position the devices now to be explained may be employed. Each vertical shaft 18 is extended somewhat below the respective tubular posts 17, and to the lower end of each shaft an arm or lever 66 is rigidly secured. The arms or levers 66 project diagonally in reverse direction, so that their free ends terminate approximately at a common point centrally under the frame of the machine and normally bear or rest against a shoulder 67 on a beveled block 68, which projects from the universal frame 52. Thus the type-wheel-actuating devices will be normally locked.

From this construction and arrangement of parts it will be seen that when a key-lever is depressed the type-wheel-actuating mechanism will be moved, as above described, and the type-wheel set for the letter corresponding to said key-lever, and simultaneously the universal bar 45 will be raised, thus raising the universal frame 52 and moving the shoulder 67 on block 68 out of line with the free ends of arms or levers 66, so as to permit the operation of the key-wheel-actuating mechanism. The operation of the gearing will cause the shafts 18 to turn in opposite directions, and consequently the arms or levers 66 will be moved in reverse directions. Now when the key-lever which had been depressed is released the universal frame 52 will be permitted to descend, whereupon the beveled block 68 (being carried down by the universal frame) will press against one of the arms or levers 66 and move it to its normal position. The other arm or lever 66 will be positively returned to its normal position by means of bent pins 69, secured to the universal frame 52, one of such pins being provided for each lever 66. Motion will thus be imparted to one of the rack-bars of the gearing through the intermediate connections, and the return of the type-wheel and the arm or lever 19 which had been actuated to their normal positions will be effected. The other rack-bar will at the same time be actuated by the pinion 16, and the other lever 19 and the other arm or lever 66 will thus be returned to their normal positions.

The universal frame 52 is provided at its end with an arm 70. Arbors 71 are adjustably secured to the brackets 56, and between these arbors the yoke 72 of a hammer 73 is pivotally supported. The pivoted end of the yoke 72 is connected by a cross-bar 74, having a lug 75 between its ends. A bent arm or bar 75ª is pivotally attached at one end to the lug 75 and at its other end has a sliding connection with the arm 70 of universal frame 52. By this construction the movement of the universal frame 52 on its fulcrum will cause the arm 70 to first move freely a short distance and then pull the arm or bar 75ª, whereby to impart a sudden movement of the hammer and result in a quick blow of said hammer against the paper and ribbon passing in front of the type-wheel. In order to lighten the hammer, a spring 77 is attached at one end thereto and at the other end to the frame of the machine.

From the construction and arrangement of hammer mechanism above described it will be seen that the hammer is operated positively by the key-lever and intermediate connections without the intervention of springs, thus simplifying the construction and also rendering it possible to regulate the blow of the hammer to some extent by the pressure applied by the operator to the key-levers. While stops for the hammer are not absolutely essential, still I prefer to provide such stops. To this end the hammer-arm is provided with two fingers or projections 78 79, the former being provided with a rubber head 80, adapted to strike the frame and cushion as well as limit the return or backward movement of the hammer. The projection 79 is screw-threaded for the reception of an adjustable head 81, (preferably of rubber,) adapted to strike the rear end of the frame. By adjusting the head 81 the degree of force with which the hammer strikes the paper passing in front of the type-wheel can be regulated, and thus the hammer can be set for manifolding purposes or for a single sheet of paper. When not manifolding, the hammer can be thrown by giving a quick blow on keys.

It will be observed that the fulcrum of the hammer is quite close to the point where the hammer-operating device engages it, so that a short movement of said operating device (the universal frame) will effect the complete and quick blow of the hammer.

The elongated portion of the frame is provided with two guide-plates 82 for the carriage B. The carriage comprises two parts 83 84, hinged together by means of a rod 85. The lower part 83 of the carriage is made in its longitudinal edges with grooves 86, into which the edges of the guide-plates project, the latter being provided with antifriction rollers or collars 87, on which the carriage runs. The upper part of the carriage normally rests upon the lower part, but can be raised slightly to permit the operator to more easily see the last line of writing. The two parts of the carriage are normally locked together. For this purpose the upper part 84 of the carriage is provided at its respective ends with depending ears 88, each provided with an elongated slot larger at one end 89 than at the other end 90, and through these slots and the end bars of the lower part 83 of the carriage a longitudinally-movable rod or bar 91 extends, said bar projecting beyond its bearings to form a thumb-piece 92 at one end and to bear against a spring 93 at the other end, which spring is secured to one end of the lower part 83 of the carriage and serves to maintain the rod or bar 91 in the larger ends of the slots in the ears 88, and thus lock the two parts of the carriage together. The rod or bar 91 is contracted in proximity to its ends, as at 94 95, so that when it is pushed longitudinally these contracted portions will aline with the smaller ends 90 of the slots in the ears 88, and thus permit the upper part of the carriage to be raised. When the part 84 of the carriage is again lowered and the rod or bar released, the spring 93 will force the latter to its normal position and effect the lock between the two parts of the carriage, as above explained. The carriage will be limited in its longitudinal movement in both directions by the engagement of a projection 96 thereon with pins or screws 97 98 at the respective ends of the elongated portion of the frame.

A ratchet-bar 99 is secured to the bottom of the part 83 of the carriage and constitutes part of the carriage-feed mechanism. A lever 100 is pivotally supported between its ends in the frame of the machine and is provided at one end with a head 101, from which a fixed dog 102 projects and adapted to engage the ratchet-bar 99. The head 101 also carries a pivoted dog 103, (and suitable stops and a spring therefor,) adapted to coöperate with the fixed dog and the ratchet-bar in effecting the feed of the carriage. From its pivotal support the lever 100 projects rearwardly toward the front of the machine and is maintained in its normal position by means of a spring 104, secured at one end thereto and bearing at its other end against the bottom of the machine-frame, or, more properly speaking, against a roller 76, mounted therein. The rearwardly-projecting arm 105 of the lever 100 extends over the universal frame 52, so that when said frame is raised by the elevation of the universal bar 45 upon the operation of a key-lever the said lever 100 will be turned on its fulcrum and operate the ratchet carriage-feed mechanism. In order to effect the operation of said ratchet-feed for spacing between words without affecting the writing or hammer devices, a key-lever 106 is located in the center of the machine, but does not extend to the universal bar. The key-lever 106 is provided at its inner end with a large key or button 107, and to its outer or forward end one end of a rod 108 is attached, the other end of said rod being connected to the arm 105 of the lever 100. Thus when the space-key 107 is depressed the ratchet feed mechanism will be actuated to permit the carriage to move one tooth. In order to regulate the tension of the key-levers, a spring 109 is employed, one end of said spring being connected with the pin 46 of the universal bar 45 by means of a link 110 and the other end of said spring being connected with an adjusting-screw 111 in the bottom of the machine-frame. A key-lever 112 is pivotally supported between its ends to a lug or projection depending from the bottom of the machine-frame. One arm of this key-lever terminates under the free end of the arm 105 of the lever 100, and the other arm projects through a yoke 113, depending from the front of the frame, and terminates under the spacing-key 107, where it is provided with a key or button 114. The lever 112 is maintained in and returned to its normal position by means of a spring 115. By means of a key-lever 112 the dogs 102 103 can be moved entirely out of engagement with the ratchet-bar 99 of the carriage-feed mechanism, and thus release said carriage and permit it to be moved back or forth at the will of the operator.

In order to propel the carriage from right to left of the machine when the ratchet feed mechanism is operated, a spring-drum 116 is attached to the machine-frame and provided with a peripheral groove, in which a cord 117 is wound, one end of said cord being secured to the drum and the other end being secured to the carriage by means of an eye 118 to receive a pin projecting therefrom. The drum 116 is mounted on a stud 119, secured to the machine-frame, said stud being provided with a hook 120 for the reception of one end of the spring 121, the other end of said spring being attached to a hook 121ᵃ in the drum. To permit the passage of the hook 120 into the drum, one face of the latter is notched, as at 122. The stud 119 also serves to support a bell 123, the hammer 124 of which is carried by an arm 125, pivoted to the machine-frame. The arm 125 is maintained in and returned to normal position by means of a spring 126, attached to said arm and machine-frame, respectively, the movement of the hammer 124 toward the bell being limited by means of a stop 127. A spring-pressed dog 128 is pivoted to the arm 125 in position to be actuated by a projection 129 on the carriage when the latter approaches the end of its forward travel.

It is desirable to provide a margin-stop for the carriage. For this purpose the rod 85 is provided at a point between its ends with a pin 130 and at one end with a thumb-piece 131, by means of which to turn the rod and bring the pin out of line with a lug 132, projecting from a stop-block 133, adjustably mounted on a ratchet-bar secured to the frame. The rod 85 will be returned to its normal position when the thumb-piece shall have been released by the operator by means of a spring 134, and thus the pin 130 will be moved in line with the stop, in which position it will be retained by means of a suitable stop-pin. The pin 130 is beveled, so that when the carriage feeds from right to left from the starting-point to the right of the lug 132 on stop-block 133 said pin will ride over said stop-lug, turning the rod 85, and then be brought automatically to its normal position by the spring 134.

An L-shaped arm 136 is mounted on the rod 85, at or near one end thereof. The arm 136 is made at one end with a perforated boss for the accommodation of the rod 85, and said boss is made with a slot 137, through which a spring-dog 138 projects, said dog being adapted to enter one or another of a series of notches 139, and thus the L-shaped arm 136 is adjustably attached to the rod 85. The purpose of the L-shaped arm 136 is to constitute a hammer-lock, so as to prevent the hammer from operating to cause an impression on the paper when the carriage approaches the end of its forward movement. Thus when the carriage shall have moved nearly to the end of its travel the arm 136 will become disposed over the horizontal arm or yoke of said hammer and prevent the throw of the latter. About the same time the hammer-lock (L-shaped arm 136) reaches the hammer the bell-hammer will be tripped and the bell sounded, so that by my improvements the signal will be sounded and at about the same time the hammer will be locked. Should it be desired to print a few letters after the hammer stop or lock reaches the hammer, this can be accomplished by turning the rod 85 by means of the thumb-piece at one end thereof, so as to move the L-shaped stop or lock-arm 136 out of the path of the hammer.

The letters and characters are arranged on the type-wheel in three rows, as usual in machines of this class, the small letters and some characters for punctuation being arranged in the top row, the capital letters and other punctuating characters in the next row, and the figures in the next row. The type-wheel is also provided below the bottom row with an underscoring character, as shown at 140. It is therefore necessary to move the type-wheel and the elongated pinion which operates it upwardly either temporarily to permit the writing of a single letter or character or permanently when it is desired to write several letters or words in capitals or a number of figures. To permit these results, the devices now to be described will be employed. Two grooved guides or rods 141 are secured to the intermediate portion of the frame at each side of the elongated pinion 28 and project both above and below the web of the frame. Through these guides two arms 142, projecting from a plate or bar 143, pass freely, the upper ends of said arms being secured to the laterally-projecting ends of a plate 144, disposed between the upper end of the elongated pinion 28 and the annular flange 31, to which the type wheel or carrier is secured. An antifriction-roller 145 is mounted in the plate 144, on which roller the annular flange 31 rides, and thus provides a roller-bearing for the type wheel or carrier. The plate or bar 143 projects laterally in both directions from the arms 142, and at its ends is made with U-shaped or slotted arms 146 147. To one side of the main frame two key-levers 148 149 are pivotally supported between their ends on a single pivot-pin, one of said key-levers being provided with a key or button 150, representing capitals, and the other key-lever being provided with a key or button 151, representing figures. The key-levers 148 149 are maintained in and returned to their normal positions by means of springs 152. Both key-levers 148 149 are adapted to play in the U-shaped or slotted arm 146; but they will be limited in their movement by fingers 153 154, which are adapted to engage the under face of the frame when the key-levers 148 149 are depressed, the finger 153 on the lever 148 being shorter than the finger 154 on the lever 149, whereby the lever 148 will be permitted to have a further movement than the lever 149. From this construction and arrangement of parts it will be seen that when one or the other key-lever is depressed the forward end thereof will engage the end wall of the slotted or U-shaped arm 146, and thus move the plate 143 upwardly and raising the type-wheel for a letter or character of the lower or intermediate row on the type-wheel, according to the key-lever 148 or 149 which has been depressed. When the key-lever 148 or 149 shall have been released by the operator, it will be returned to its normal position by means of the spring, as above explained, the plate 143 will be forced downwardly by a spring 155, and the type-wheel and elongated pinion will drop to their normal positions. It frequently happens, as above intimated, that it is desirable to set the type-wheel permanently or for a considerable time, as when one or more words are to be written with capital letters or it is desired to write a number of figures. For this reason two additional key-levers 156 157 are pivoted to the main frame at the opposite side thereof from the key-levers 148 149 and are in all respects duplicates of the latter. The forward ends of the key-levers 156 157 play within the slotted or U-shaped arm 147 and coöperate with the same to effect the setting of the type-wheel in precisely the same manner as above explained in connection with the key-levers 148 and 149. A small transverse shaft 158 is mounted in suitable bearings in the framework. Both ends of this shaft extend beyond the bearings, and on one end an arm 159, having two teeth 160 161, is secured and adapted to be engaged by a pin or projection 162 on the slotted arm 147 of the plate or bar 143. To the other end of the shaft 158 an arm 163 is secured and made to normally bear against the outer face of the upper end of the slotted or U-shaped arm 147 by means of a spring 164ª. Now when one of the key-levers 156 or 157 is depressed the bar or plate 143, elongated pinion 28, and the type-wheel will be raised in the manner as above explained, but the pin or projection 162 will engage one or the other of the teeth 160 161 of arm 159, and the parts, including the type-wheel, will thus be retained in an elevated position after the key-lever shall have been released, so as to permit continued use of capitals or figures, as the case may be. It will be readily seen, however, that when one of the key-levers 148 or 149 is depressed the free end thereof will engage the arm 163 and cause the shaft 158 to be turned sufficiently to move the toothed arm 159 out of the path of the pin or projection 162 on the slotted or U-shaped arm 147. For this reason the type-wheel will not be retained elevated when either lever 148 149 is depressed, but as the arm 163 is omitted from the end of the shaft adjacent to the ends of the key-levers 156 157 the shaft will not be turned by the operation of either lever 156 or 157, and consequently the locking-arm 159 will be free to act to retain the type-wheel elevated in the position to which it may be raised by one of the key-levers 156 157. It is apparent that the type-wheel can be released from its elevated position by a depression of either lever 148 or 149, the end of the lever which has been depressed engaging the arm 163 and turning the shaft 158, so as to move the locking-arm 159 away from the pin or projection 162 on the arm 147, and thus release the bar 143 and permit the return of the type-wheel to its normal position.

Returning now to the carriage, the means for carrying and feeding the paper will be described.

Between the end plates 164 165 of the upper part of the carriage a paper-carrying roller 166 is mounted in elongated bearings, and with this paper-carrying roller a single rubber-covered feed-roller 167 coöperates to effect the proper feeding of the paper. The roller 166 is intended to receive and have wound thereon the paper on which the writing is to be done, but it acts also, as above intimated, in coöperation with the roller 167 to feed the paper. The roller 166 is normally forced toward the roller 167 by means of springs 168. A rod or bar 169 is disposed behind the roller 166 and mounted in elongated slots in the end plates of the carriage. To this rod or bar a plate 170 is secured and provided with a number of fingers 171, some preferably longer than others and adapted to embrace the paper-carrying roller 166, so as to terminate over and in proximity to the feed-roller 167. The straight edge 172 of the plate 170 is disposed under the feed-roller and serves to guide the paper to the paper-carrying roller 166. The paper-carrying roller is provided at one end with a knob 173, and on the adjacent journal of the feed-roller a notched wheel 174 is secured. An arm 175 is pivotally connected to the end plate 164 of the carriage and provided between its ends with a tooth 176 to engage the notched wheel 174, into contact with which it is forced by means of a spring 177, and the free end of said arm 175 is made with a thumb-piece 178. At a point between its ends the arm 175 is provided with a projection having a pin 179 thereon to be engaged by the hooked end of a pivotally-supported weighted lever 180, whereby to retain the tooth 176 of arm 175 out of contact with the notched wheel 174 when desired. By means of these devices the paper can be brought accurately to line of writing. If a sheet of paper be inserted into the machine and wound on the paper-carrying roller at least once and the pivoted arm 175 be released, so that the tooth will engage the notched wheel, the paper can be adjusted accurately by turning the paper-carrying roller by means of the knob 173. In such case the feed-roller 167 will be held fixed either by the engagement of the spring-pressed arm 175 therewith or by the finger of the operator and the paper made to slide over said feed-roller without turning it. Thus the paper can be easily, quickly, and accurately adjusted by means of the knob 173.

The wheel 174 is made with a number of notches, each representing a half-line space on the paper when the carrying-roller 166 is turned, so that by means of the paper-feed devices above described the paper can be fed (two notches of the notched wheel for each line of writing) without the use of other line-space feed mechanism, and said devices also permit accurate half-line spacing when it is desired to do fancy or tabulated work. I prefer, however, to also provide separate means for accomplishing the line-feed of the paper, and these means will now be explained. An angular lever 181 is pivotally attached to the end plate 165 of the carriage and provided at its upper extremity with a thumb-piece 182. The lower arm 183 of the lever 181 is enlarged and provided at one end of said enlarged portion with a hook 184 to engage a journal of the feed-roller 167, whereby to limit the movement of said lever in one direction. A ratchet-wheel 185 is secured to the journal of the feed-roller and is adapted to be actuated by a small ratchet-bar 186, pivotally connected at one end to the enlarged portion of the angular lever 181 and prevented from accidental escape therefrom by means of a spring 187. The maximum movement of the lever 181 for effecting a movement of the rollers sufficient to move the paper for a double space is limited by the engagement of a shoulder 188 on said lever with the journal of the feed-roller. In order to adjust the lever 181 for a single space, it is simply necessary to place an obstruction to the throw of said lever. For this purpose an arm 189 is pivoted between its ends to the lever 181. By moving this arm so that the end 190 thereof is in line with the journal of the feed-roller it will engage said journal when the lever 181 is turned, so that said lever 181 can be moved only a sufficient extent to permit the paper to be fed for a single line. The arm 189 is preferably provided with a notch 191, into which a pin 192 projects, whereby to limit the movements thereof. The return movement of the lever 181 is effected by a spring 181ᵃ.

I will now explain the ribbon carrying and feed mechanism.

The shafts 18 are extended somewhat above the wheel-moving levers 19, as at 193, and on these projecting ends of the shafts sleeves 194 are loosely mounted and adapted to project through holes in the sheet-metal cover 195 of the machine, said sleeves being prevented from vertical movement by means of screws 196, inserted in the upper ends 193 of the shafts 18. Each sleeve 194 is provided at its lower end with a spur-wheel 197, and the upper end 198 of each sleeve 194 is contracted to form a shoulder 199. Ribbon-reels 200 are located on the upper ends 198 of the sleeves 194 (above the sheet-metal cover 195) and adapted to rest on the shoulders 199. Each reel comprises two parallel plates and a hub, and to the latter a hook $m$ is secured for the reception of the end of the inking-ribbon. In order to prevent the rotation or vertical movement of the ribbon-reels independently of the sleeves 194, the upper parts 198 of the latter are split, so as to cause the parts thereof to tend to spring outwardly and hold the reels in place by friction.

A bracket 201 is loosely mounted on the central post 15, and in this bracket a transverse shaft 202 is loosely mounted, said shaft carrying worms 203 at its respective ends to mesh alternately with the respective spur-wheels 197. In order to move the bracket 201 and shaft 202 so as to cause one or the other worm to mesh with its coöperating spur-wheel, whereby to cause the inking-ribbon to be fed in one direction or the other, a spring-arm 204 is secured to the bracket 201 and provided at its free end with a pin or knob 205, which projects through a hole 206 in the cover 195. A tooth 207 projects into the hole 206 to be engaged by the pin or knob 205, whereby to retain the worm-shaft in mesh with one or the other of the spur-wheels. A ratchet-wheel 208 is secured to the worm-shaft 202, and in close proximity to said ratchet-wheel a bell-crank lever 209 is loosely mounted on the worm-shaft. The depending arm of the bell-crank lever 209 normally rests against one of the arms 57, secured to the universal frame. To the other arm of said bell-crank lever a dog 210 is loosely pivoted and adapted to engage the ratchet-wheel 208. From this construction and arrangement of parts it will be seen that when motion is transmitted to the universal frame by the operation of a key-lever, as hereinbefore explained, and the arms 57 are moved backwardly the engagement of one of said arms with the bell-crank lever will cause the latter to turn on its fulcrum and cause the dog 210 to turn the ratchet-wheel 208 and the worm-shaft, and thus transmit motion to one of the ribbon-reels, whereby to feed the inking-ribbon.

In order to provide simple and efficient means whereby the paper will be inserted into the machine straight and so that the paper can be properly adjusted in the carriage for a particular line of writing, I provide the cover 195 of the carriage with pointers 211 211 at opposite sides of the type-carrier. It is evident that by making both of these pointers project toward the edge of the paper or to a line of writing the paper will be properly in the carriage.

To denote the last letter printed on the paper, an indicator, such as an arrow 212, is made on the type-wheel to show the normal position of rest of the type-wheel.

The cover 195 of the machine is preferably provided with a curved slot 213, through which a pin 214 on one of the fliers moves. By this means the operator can readily see whether or not the fliers are operating properly.

Various changes in details of construction of my invention might be made without departing from the spirit thereof or limiting its scope, and hence I do not wish to limit myself to the precise details herein set forth.

Having fully described my invention, what I claim as new, and desire to secure by Letters Patent, is—

1. In a type-writing machine, the combination of a type-carrier, gearing connected therewith, levers constructed to impart motion to said gearing, bearings on each of said levers, a roller revolubly mounted in the bearings on each lever and key-levers constructed at their forward ends to engage said rollers and move said levers to operate the type-carrier, substantially as set forth.

2. In a type-writing machine, the combination with a type-carrier, gearing connected therewith and key-levers, of a lever having a rack-bar to impart motion to said gearing, an arm on said lever, lugs on said arm and a roller mounted in said lugs and adapted to be engaged by the key-levers, substantially as set forth.

3. In a type-writing machine, the combination with a type-wheel, a pinion connected therewith, key-levers and intermediate mechanism for imparting motion to said type-wheel, of two fliers adapted to receive motion from said pinion and to move together simultaneously in the same direction so as to coöperate simultaneously with a key-lever to stop the gearing and hold the type-carrier in the position to which it may be moved, substantially as set forth.

4. In a type-writing machine, the combination with a type-carrier, a pinion connected therewith, key-levers and intermediate devices for moving the type-carrier, of two fliers constructed to receive motion from said pinion and adapted to coöperate with the key-levers, one of said fliers having curved arms terminating near the respective sides of the other flier, substantially as set forth.

5. In a type-writing machine, the combination with a type-carrier, a pinion connected therewith, key-levers and devices intermediate of the key-levers and pinion whereby to rotate the type-carrier, of a flier constructed to receive motion from said pinion, said flier having two arms at its free end to receive a key-lever between them, whereby to hold the type-carrier in the position to which it may be moved by said key-lever, substantially as set forth.

6. In a type-writing machine, the combination with a type-carrier, a pinion connected therewith, key-levers and devices intermediate the key-levers and said pinion, of a flier constructed to receive motion from said pinion, said flier having two curved adjustable arms at its free end adapted to receive a key-lever between them, substantially as and for the purpose set forth.

7. In a type-writing machine, the combination with a type-carrier, and a pinion connected therewith, of two fliers constructed to receive motion from said pinion, one of said fliers having two arms which terminate near the respective sides of the other flier, key-levers having beveled edges to enter between one flier and one or the other arms of the other flier and propelling devices between said key-levers and said pinion, substantially as set forth.

8. In a type-writing machine, the combination with the carrier and gearing connected therewith, of a series of key-levers, pivoted levers coöperating with the key-levers and with said gearing, and a universal bar to be actuated by said key-levers, said universal bar being constructed and adapted to return said pivoted levers to and retain them in their normal position, substantially as set forth.

9. In a type-writing machine, the combination with a type-carrier, key-levers and gearing intermediate of the type-carrier and key-levers, of a universal bar to be actuated by the key-levers and coöperating with the gearing to return the same and the type-carrier to and retain them in their normal positions, substantially as set forth.

10. In a type-writing machine, the combination with a type-carrier, key-levers, gearing between the key-levers and type-carrier and a flier coöperating with said gearing and key-levers, of a universal bar to be actuated by said key-levers and coöperating with said gearing and flier to retain them in their normal positions, substantially as set forth.

11. In a type-writing machine, the combination with a type-carrier, key-levers, gearing coöperating with the key-levers and type-carrier and a flier coöperating with the key-levers and gearing, of a universal bar to be actuated by said key-levers, and arms on said universal bar projecting toward each other and adapted to coöperate with the flier to prevent the vibration of the latter when it comes to normal position, substantially as set forth.

12. In a type-writing machine, the combination with a type-carrier, gearing connected therewith pivoted levers coöperating with said gearing and key-levers constructed to actuate said pivoted levers, of a universal bar to be actuated by said key-levers and adapted to engage said pivoted levers and move them to their normal positions, a pivoted device connected with said universal bar and arms secured to said pivoted device and adapted to engage said pivoted levers and coöperate with the universal bar to return said pivoted levers to and retain them in their normal positions, substantially as set forth.

13. In a type-writing machine, the combination with a type-carrier, gearing connected therewith and key-levers, of two vertical shafts, levers secured to said shafts and coöperating with said gearing and key-levers, a universal bar to be actuated by the key-levers and adapted to engage said pivoted levers, a pivoted device under the frame of the machine and connected with said universal bar, a beveled block on said pivoted device, pins also on said pivoted device, and arms on said shafts and coöperating with said beveled block and pins to assist in returning said pivoted levers, gearing and type-carrier to their normal positions, substantially as set forth.

14. In a type-writing machine, the combination with a type-carrier, key-levers, gearing intermediate of the key-levers and type-carrier and a universal bar common to said key-levers, of a star-wheel secured to said type-carrier, a spring-pressed dog normally out of contact with said star-wheel, arms secured to said dog, a pivoted device under the frame of the machine and connected with said universal bar and arms secured to the pivoted device and adapted to engage the arms on said dog whereby to positively force the latter into contact with the star-wheel, substantially as set forth.

15. In a type-writing machine, the combination with a frame having a slotted flange, a type-carrier, gearing connected with said type-carrier and key-levers projecting through said slotted flange and coöperating with said gearing, of a universal bar concentric with said flange, a guide-pin secured to said universal bar and adapted to move in one of the slots of said slotted flange and hammer mechanism connected with said universal bar, substantially as set forth.

16. In a type-writing machine, the combination with a frame having a slotted flange, of a type-carrier, gearing connected therewith, a series of key-levers projecting through the slots of said flange and coöperating with said gearing, and cord laced through said slotted flange, substantially as and for the purpose set forth.

17. In a type-writing machine, the combination with a type-carrier, key-levers and gearing between said key-levers and type-carrier, of a universal bar common to said key-levers and adapted to be moved by said key-levers throughout the full extent of their throw, a spring connected with said universal bar and means for adjusting said spring whereby to regulate the tension of the key-levers, substantially as set forth.

18. In a type-writing machine, the combination with a type-carrier, key-levers and gearing between said key-levers and type-carrier, of a universal bar common to said key-levers and adapted to be moved by said key-levers throughout the full extent of their throw, a spring attached at one end to said universal bar, and a screw adjustably attached to the frame of the machine, to which screw the other end of said spring is attached, substantially as set forth.

19. In a type-writing machine, the combination with a type-carrier, key-levers and intermediate connections for turning the type-carrier, of a pivoted frame coöperating with said key-levers, a hammer having a pivotal support under the type-carrier and in line therewith, and a positive connection between the pivoted end of said hammer and said pivoted frame, whereby a movement of said pivoted frame will be positively transmitted to the hammer and cause it to make a quick and sudden blow, substantially as set forth.

20. In a type-writing machine, the combination with a type-carrier, key-levers and intermediate connections for turning the type-carrier, of a pivoted frame coöperating with the key-levers, a hammer having a pivotal support rearwardly of the axis of the type-carrier and a connecting device attached at one end to said pivoted hammer and at the other end to the pivoted frame at a point forwardly of the axis of the type-carrier, substantially as set forth.

21. In a type-writing machine the combination with a type-carrier, key-levers and intermediate actuating mechanism, of a pivoted frame coöperating with the key-levers, a pivoted hammer, a lug projecting from the arm of said hammer at the pivotal point thereof, an arm projecting from the pivoted end of the pivoted frame, and a bar pivoted at one end to said lug on the hammer and having a movable connection at its other end with said arm on the pivoted frame, substantially as set forth.

22. In a type-writing machine, the combination with a frame, of a pivoted hammer, an arm or projection thereon, and a cushion on said arm or projection adapted to rest on the frame and limit the return movement of the hammer, and serving to support said hammer in its normal position of rest, substantially as set forth.

23. The combination in a type-writing machine, of a type-carrier, means for operating the same, a carrier or hammer-arm having a hammer-head, and a stop disposed over said hammer-arm whereby to arrest the movement thereof when the carriage approaches the end of its travel.

24. The combination in a type-writing machine, of a type-carrier, means for operating the same, a carriage, a hammer, and an adjustable stop disposed over the arm of the hammer and constructed and arranged to lock the hammer-arm and prevent the operation of the same when the carriage approaches the end of its travel, substantially as set forth.

25. The combination in a type-writing machine, of a type-carrier, means for operating the same, a carriage, a hammer, a stop over the arm of the hammer and constructed and adapted to lock the hammer-arm and prevent the operation of the hammer when the carriage approaches the end of its travel and means for moving said stop out of the path of the arm of the hammer, substantially as set forth.

26. The combination in a type-writing machine, of a type-carrier, means for operating the same, a carriage, a hammer, a revoluble rod mounted in the carriage above the arm of the hammer, an arm on said revoluble rod adapted to be disposed over the hammer-arm whereby to lock the hammer-arm when the carriage approaches the end of its travel and a thumb-piece on said revoluble rod, substantially as set forth.

27. The combination in a type-writing machine, of a type-carrier, means for operating the same, a carriage, a hammer, and an adjustable stop-arm carried by the carriage, disposed over the arm of the hammer and adapted to lock the hammer when the carriage approaches the end of its travel, substantially as set forth.

28. The combination in a type-writing machine, of a type-carrier, means for operating the same, a hammer, a carriage, a rod disposed over the arm of the hammer, and a lock-arm for the hammer-arm mounted on said rod and adjustable longitudinally thereof, substantially as set forth.

29. The combination in a type-writing machine, of a type-carrier, means for operating the same, a carriage, a hammer, a rod mounted in the carriage above the arm of the hammer having a series of notches or grooves therein, a stop-arm mounted on said rod and adapted to lock the hammer-arm and a spring-dog carried by the stop-arm and adapted to enter one or another of said grooves or notches substantially as set forth.

30. In a type-writing machine, the combination with a type-carrier and an elongated pinion connected therewith, of two segments meshing with said elongated pinion, means for adjustably securing said segments together, key-levers and intermediate devices coöperating with said key-levers and said segments, substantially as set forth.

31. In a type-writing machine, the combination with a type-carrier, and an elongated pinion connected therewith, of two segments meshing with said elongated pinion, one of said segments having a slot therein, a headed screw passing through said slot and entering the other segment, key-levers and intermediate devices coöperating with said key-levers and segments, substantially as set forth.

32. The combination in a type-writing machine, of a frame, a series of radiating key-levers mounted on said frame, a lug on each key-lever, finger keys or buttons having letters and characters thereon and having sockets for the reception of said lugs, said sockets being disposed at an angle to the letters and characters and at an angle to the key-levers, whereby the letters and characters on all the finger keys or buttons will be parallel with each other and at right angle to the operator, substantially as set forth.

33. In a type-writing machine, the combination with the carriage-frame, of a paper-carrying roller mounted therein, a knob on the journal of said roller, a feed-roller coöperating with the paper-carrying roller, a notched wheel on said feed-roller, each notch of said notched wheel representing one-half of a line-space, a spring-actuated lever having a tooth to engage said notched wheel a pin on said lever, and a weighted lever pivoted between its ends to the carriage-frame and having a hook to engage said pin, whereby to retain the tooth on the first-mentioned lever out of engagement with the notched wheel, substantially as set forth.

34. In a type-writing machine, the combination with a carriage-frame, of a paper-carrying roller and a feed-roller mounted in said frame, a ratchet-wheel on the journal of the feed-roller, a lever pivoted to the carriage-frame and having a hook-shaped lower end adapted to engage the journal of the feed-roller whereby to limit the throw of said lever, a ratchet-bar carried by the lever and adapted to mesh with said ratchet-wheel, a spring for moving said lever in one direction, an arm or lever pivoted to the first-mentioned lever for limiting the throw of the latter and a stop for limiting the movements of said arm or lever, substantially as set forth.

35. In a carriage for a type-writing machine, the combination with a lower sliding part and an upper hinged part, of slotted lugs depending from the hinged part, each slot being enlarged at one end, a longitudinally-movable rod mounted in the sliding part of the carriage and passing through said slotted lugs, said rod having contracted portions to enter the contracted portions of the slots in said lugs, a spring bearing against said rod for moving it longitudinally in one direction and maintaining it in its normal position for locking the two parts of the carriage together and a button at the other end of said rod whereby to move the rod to unlock the two parts of the carriage, substantially as set forth.

36. In a type-writing machine, the combination with the type-wheel, of an indicator on and adapted to move with said type-wheel and so located on the type-wheel as to denote the point of rest of the type-wheel with respect to the paper on the carriage of the machine, whereby to denote the point on paper where the last letter was printed, substantially as set forth.

37. In a type-writing machine, the combination with a frame and a carriage, of a drum, a shank or pin adapted to be secured to the frame and having a bell secured to one end thereof, said shank or pin being also adapted to pass through the drum, a hook on said shank or pin, the hole in one face of the drum being enlarged to permit the passage of said hook, a hook in the drum, a spring in the drum and attached at its respective ends to said hooks, a cord attached to the carriage and wound on said drum, and a hammer for the bell adapted to be controlled by the carriage, substantially as set forth.

38. In a type-writing machine, the combination with the type-carrier, gearing connected therewith, key-levers coöperating with said gearing and a cover having a slot therein, of a flier connected with said gearing and an indicator-pin on said flier and projecting through the slot in the cover, substantially as set forth.

39. In a type-writing machine, the combination with a type-carrier, gearing connected therewith, levers coöperating with said gearing, key-levers each having a curved cam end, and a roller mounted on each of said first-mentioned levers, with which rollers the curved cam ends of the key-levers coöperate.

In testimony whereof I have signed this specification in the presence of two subscribing witnesses.

RICHARD WILLIAM UHLIG.

Witnesses:
 JOHN E. TILTON,
 WM. B. BALDWIN.